US012264787B2

(12) United States Patent
Van Bommel et al.

(10) Patent No.: US 12,264,787 B2
(45) Date of Patent: Apr. 1, 2025

(54) LED FILAMENT ARRANGEMENT

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/770,670

(22) PCT Filed: Oct. 21, 2020

(86) PCT No.: PCT/EP2020/079635

§ 371 (c)(1),
(2) Date: Apr. 21, 2022

(87) PCT Pub. No.: WO2021/083765

PCT Pub. Date: May 6, 2021

(65) Prior Publication Data

US 2022/0364685 A1 Nov. 17, 2022

(30) Foreign Application Priority Data

Oct. 31, 2019 (EP) .................................... 19206407

(51) Int. Cl.

*F21K 9/232* (2016.01)
*F21K 9/23* (2016.01)
*F21Y 103/10* (2016.01)
*F21Y 103/20* (2016.01)
*F21Y 107/70* (2016.01)
*F21Y 115/10* (2016.01)

(52) U.S. Cl.

CPC ................ *F21K 9/232* (2016.08); *F21K 9/23* (2016.08); *F21Y 2103/10* (2016.08); *F21Y 2103/20* (2016.08); *F21Y 2107/70* (2016.08); *F21Y 2115/10* (2016.08)

(58) Field of Classification Search

CPC ... F21K 9/232; F21Y 2103/20; F21Y 2107/70
See application file for complete search history.

(56) References Cited

U.S. PATENT DOCUMENTS

2003/0031015 A1* 2/2003 Ishibashi .................. F21V 3/00 362/800
2013/0155683 A1* 6/2013 Matsuda ................ F21V 15/01 362/249.02
2018/0119892 A1* 5/2018 Jiang ..................... H05B 45/00
2018/0135810 A1* 5/2018 Lin ........................ F21K 9/235

(Continued)

FOREIGN PATENT DOCUMENTS

CN 109253406 A 1/2019
CN 111434189 A 7/2020

(Continued)

*Primary Examiner* — William N Harris

(57) ABSTRACT

A light emitting diode, LED, filament arrangement (100), comprising at least one LED filament (110) comprising an array of a plurality of light emitting diodes, LEDs. The at least one LED filament (110) is of an elongated shape, and is at least partially extending along an axis, A. The at least one LED filament comprises at least one branch (120, 121) extending from the elongated LED filament (110) and is arranged at an angle, α, to the axis A.

15 Claims, 3 Drawing Sheets

(56) References Cited

U.S. PATENT DOCUMENTS

| | | | | |
|---|---|---|---|---|
| 2020/0096160 | A1* | 3/2020 | Kudaev | F21K 9/90 |
| 2020/0326039 | A1* | 10/2020 | Zhang | F21V 9/30 |

FOREIGN PATENT DOCUMENTS

| | | | |
|---|---|---|---|
| EP | 3312495 | A1 | 4/2018 |
| JP | 2012060058 | A | 3/2012 |
| JP | 2012188771 | A | 8/2012 |
| JP | 2018172218 | A | 8/2012 |
| JP | 2015144030 | A | 8/2015 |
| JP | 2017017334 | A | 6/2018 |
| JP | 2019087164 | A | 6/2019 |
| WO | 2019015763 | A1 | 1/2019 |
| WO | 2019087164 | A1 | 5/2019 |

* cited by examiner

LED FILAMENT ARRANGEMENT

CROSS-REFERENCE TO PRIOR APPLICATIONS

This application is the U.S. National Phase application under 35 U.S.C. § 371 of International Application No. PCT/EP2020/079635, filed on Oct. 21, 2020, which claims the benefit of European Patent Application No. 19206407.9, filed on Oct. 31, 2019. These applications are hereby incorporated by reference herein.

FIELD OF THE INVENTION

The present invention generally relates to lighting arrangements comprising one or more light emitting diodes (LEDs).

BACKGROUND OF THE INVENTION

The use of light emitting diodes (LEDs) for illumination purposes continues to attract attention. Compared to incandescent lamps, fluorescent lamps, neon tube lamps, etc., LEDs provide numerous advantages such as a longer operational life, a reduced power consumption, and an increased efficiency related to the ratio between light energy and heat energy.

In particular, there is currently a very large interest in lighting devices and/or arrangements (such as lamps) provided with LEDs, and incandescent lamps are rapidly being replaced by LED-based lighting solutions. It is nevertheless appreciated and desired to have retrofit lighting devices (e.g. lamps) which have the look of an incandescent bulb. In particular, lamps utilizing LED filaments arranged in bulbs similar to those of incandescent lamps are highly appreciated as they are decorative like incandescent lamps while still holding the advantages of LEDs.

However, there is a wish to provide alternatives for the construction and arrangement of the LED lamps, in particular regarding the LED filament design. More specifically, there is a need for improving the efficiency, dynamics and decorative effects of the LED filament lamps of the prior art.

Hence, it is an object of the present invention to provide alternatives to LED filament arrangements of the prior art in order to improve the dynamics, efficiency, and decorative aspect of the LED filament lamps.

WO 2019/015763 discloses a LED lamp, comprising: a transparent housing having a bulbous shape; a flexible LED filament, mounted in a curved shape inside the transparent housing; a filament holder, mounted on the base part and extending into the transparent housing, the filament holder having a plurality of holding parts which are positioned to hold the flexible LED filament at a plurality of spaced-apart locations along its length and thereby define the curved shape of the flexible LED filament.

SUMMARY OF THE INVENTION

It is of interest to provide alternative LED filaments in order to improve the dynamics, efficiency and decorative aspect during operation.

A LED filament is providing LED filament light and comprises a plurality of light emitting diodes (LEDs) arranged in a linear array. Preferably, the LED filament has a length L and a width W, wherein L>5W. The LED filament may be arranged in a straight configuration or in a non-straight configuration such as for example a curved configuration, a 2D/3D spiral or a helix. Preferably, the LEDs are arranged on an elongated carrier like for instance a substrate, that may be rigid (made from e.g. a polymer, glass, quartz, metal or sapphire) or flexible (e.g. made of a polymer or metal e.g. a film or foil).

In case the carrier comprises a first major surface and an opposite second major surface, the LEDs are arranged on at least one of these surfaces. The carrier may be reflective or light transmissive, such as translucent and preferably transparent.

The LED filament may comprise an encapsulant at least partly covering at least part of the plurality of LEDs. The encapsulant may also at least partly cover at least one of the first major or second major surface. The encapsulant may be a polymer material which may be flexible such as for example a silicone. Further, the LEDs may be arranged for emitting LED light e.g. of different colors or spectrums. The encapsulant may comprise a luminescent material that is configured to at least partly convert LED light into converted light. The luminescent material may be a phosphor such as an inorganic phosphor and/or quantum dots or rods.

The LED filament may comprise multiple sub-filaments.

This and other objects are achieved by providing a LED filament arrangement and a LED filament device having the features in the independent claims. Preferred embodiments are defined in the dependent claims.

Hence, according to a first aspect of the present invention, there is provided a light emitting diode, LED, filament arrangement. The LED filament arrangement comprises at least one LED filament which in turn comprises an array of a plurality of light emitting diodes, LEDs. The at least one LED filament is of an elongated shape which extends, at least partially, along an axis, A. The LED filament arrangement further comprises a bifurcation from which the at least one LED filament (110) splits into at least two branches of which at least one branch of the LED filament is arranged at an angle with respect to the axis A such that the at least one branch is extending from the elongated body.

The word bifurcation is here used in the meaning of fork, embranchment, crotch etc., or any other word for making clear that the LED filament splits into two or more directions in a similar way as the branches in a tree.

In a further embodiment of the present invention, the at least one LED filament comprises an encapsulant integrally enclosing the LED filament including the at least two branches. This has the advantage that the different branches form a completely encapsuled part of the LED filament arrangement covering the transitions from one part to another part of the arrangement. In other words, the one-piece encapsulant covers the LED filament including the branching areas.

In another embodiment the LEDs in the array are arranged to provide a continuous light distribution over the entire LED filament including the at least two branches. This has the nice effect that in the illumination pattern of the LED filament the branching area shows the same intensity and it is not a dark part of the filament.

In order to have a simple wiring, in a further embodiment, in the LED filament arrangement the line of emission of the array of a plurality of LEDs continues through the branches. This has the advantage that the LED in the filament are for instance all connected in series and that there are only two wires required for driving all the branches of said LED filament arrangement. In other configurations the LEDs in the different branches may be connected in parallel, such that each branch has a separate electrical connection.

According to the second aspect of the present invention, there is provided a LED filament device which comprises n sets of LED filaments. In the LED filament device, each set of LED filaments comprises at least one LED filament which in turn comprises an array of a plurality of light emitting diodes, LEDs. At least one of the LED filaments is of an elongated shape, which at least partially extends along an axis, A. The at least one LED filament comprises at least one branch arranged at an angle, α, to the axis, A. The LED filaments of the LED filament device are configured such that at least one LED filament of the $(k+1)^{th}$ set of LED filaments constitutes the at least one branch of the at least one LED filament of the $k^{th}$ set of LED filaments, in an iterative manner from k=1, 2, . . . , n−1, such that the n sets of LED filaments constitute a tree-like structure of LED filaments.

Thus, the first and second aspect of the present invention share a common general inventive concept or idea of providing a LED filament arrangement or device wherein the LED filament(s) are constructed as to form specific structures. According to the first and second aspect of the present invention, the LED filament(s) has an elongated shape, extending along an axis A, with at least one branch extending from the axis A. The branched LED filament will comprise more than two ends and may for example entail a dichotomized or a trichotomized LED filament. This means, the present invention may comprise more complex structures of LED filaments than previously known. The lighting of such a LED filament arrangement may be more dynamic and efficient than other non-branched LED filaments.

It will be appreciated that the LED filament arrangement may distribute the light emitted by the LEDs in a specific manner depending on the arrangement of the LED filament. The present invention is hereby advantageous in that the LED filament arrangement or device may direct or distribute the light in order to achieve an increased efficiency regarding the light distribution compared to a LED filament unit without branched filaments.

The present invention is further advantageous in that the branched LED filaments of the LED filament arrangement/device may be conveniently designed to provide a desired lighting distribution in terms of illumination and/or decorative purposes. For example, the properties such as the shape and size of the branches of the LED filament(s) may be chosen for different lighting purposes of the LED arrangement/device.

The present invention is further advantageous in that the LEDs of the LED filament arrangement may emit light from the LED filament and the branch(es) thereof in a continuous line or plane, thereby achieving an even more improved decorative light effect and/or a better mimicking of filaments of conventional lamps/bulbs.

As is understood from the second aspect of the current invention, the LED filament device may comprise combined branched LED filaments which may form relatively complex patterns such as tree-like structures. This may further enhance the lighting efficiency, dynamics and/or decorative aspect of the lighting arrangement.

For example, the branched LED filament arrangement according to the present invention may be configured in such a way that certain patterns or visual effects are achieved. Specifically, light may be spread more evenly, or intentionally emphasized in certain areas of the LED filament arrangement.

It will be appreciated that the LED filament arrangement/device of the present invention furthermore comprises relatively few components. The relatively low number of components is advantageous in that the LED filament arrangement or device is relatively inexpensive to fabricate.

The LED filament arrangement and LED filament device according to the first and the second aspects of the present invention, respectively, comprise at least one LED filament. The at least one LED filament, in its turn, comprises an array of LEDs. By the term "array", it is here meant a linear arrangement or chain of LEDs, or the like, arranged on the LED filament(s). The LED filament arrangement according to the first aspect of the present invention comprises at least one branch of the LED filament. By the term "branch", it is here meant a structure, unit, or the like, which is structurally a part of the LED filament. In other words, the LED filament may comprise a first (principal) portion and a second portion which is arranged at an angle from the first portion, wherein the second portion constitutes a branch. The branch may comprise the same or similar components as the LED filament in its entity. This meaning, the branch(es) and the, along the axis A, elongated body of the LED filament may both comprise; LEDs, a carrier substrate onto which the diodes are attached, etc. It will be appreciated that the branch(es) may have different properties than other parts/branches of the LED filament. Further, the branch(es) of the LED filament are arranged at an angle α, to the axis A so as to form the LED filament's branched shape.

According to an embodiment of the preset invention, the at least one LED filament comprises a plurality of branches. For example, the LED filament may comprise N branches, wherein N is preferably 2-4. Hence, the LED filament may comprise branches extending from one or more sides of the elongated shape. Furthermore, the branches may have various sizes, and/or the branches may be arranged at the same or different angles to the axis A. The present embodiment is advantageous in that an even better mimicking of a conventional filament of a lamp/bulb may be achieved.

This is advantageous as a plurality of branches means opportunities to create more complex LED filaments and LED filament arrangements. More complex structures of this sort may not only improve the aesthetics of the LED filament arrangements and be highly decorative but may also improve the lighting efficiency, as well as the scattering and distribution of light. Thus, the area of use increases which may further substitute, for example, incandescent lamps which would be desirable, as LED lamps are more resource and energy efficient. The possibility to acquire relatively complex structures using a low number of components is advantageous in that the LED filament arrangement is relatively inexpensive to fabricate.

According to an embodiment of the preset invention at least a first branch of the plurality of branches of the LED filament has a different length than a second branch of the plurality of branches of the LED filament. Hence, of the plurality of branches of a LED filament, at least one branch is of a different length than the other branches. The present embodiment is advantageous as it further increases alternative formations of branches and LED filaments, thus, also the versatility of the LED filament arrangements. This embodiment may further provide a positioning of the LED filament in manners that would be unsuitable, or impossible, with branches of equal length. Further, the lighting dynamics of a branched LED filament with branches of various lengths is understood to be increased.

According to an embodiment of the present invention, the at least one LED filament is Y-shaped. In other words, the LED filament is dichotomized such that there is one bottom end of the LED filament and two ends on the opposite, top part, of the LED filament. The present embodiment is advantageous in that the Y-shape further enhances the light distribution of the LED filament. The Y-shaped LED filament may have the advantage of being particularly suited for combinations in the LED filament device as previously described. For example, tree-like structures of the LED filament arrangement are conveniently accomplished, thus increasing the properties of such LED filament arrangements along with ease of production. Further, Y-shaped LED filaments may be advantageous in that a symmetric arrangement of the LED filament arrangement may be realized, resulting in a more even light distribution.

According to an embodiment of the present invention the at least one LED filament is X-shaped. In other words, the branched LED filament of the LED filament arrangement comprises four ends configured such that two ends are arranged at the top and two ends are arranged at the bottom. The present embodiment is advantageous in that the X-shaped LED filament is more or less symmetrical. This may lead to a scattering of light in a more omnidirectional manner, which may increase the efficiency and enhance the light distribution. Further, the X-shaped LED filament may prove advantageous as complex structures with multiple intersections may be achieved in a LED arrangement, further increasing lighting effects and light distribution.

According to an embodiment of the present invention, the LEDs of at least a set of LEDs of the plurality of LEDs in the LED filament are connected in series. The present embodiment is advantageous as specific lighting effects may be accomplished where equal light intensity over a plurality of diodes in a set is conveniently accomplished. Further, the embodiment is advantageous as a serially connected set of diodes may constitute a certain part, such as a branch, of the LED filament. This could further enhance the possibility of creating specific light scattering arrangements, for example increasing dynamics. Furthermore, this could enhance simplicity in production, and thereby reduce economic costs.

According to an embodiment of the present invention, the LEDs of at least a first set of LEDs of the plurality of LEDs and the LEDs of at least a second set of LEDs of the plurality of LEDs in the LED filament are connected in parallel. This meaning, some LEDs of the plurality of LEDs are arranged in parallel connection, whilst other may be in serial connection. One embodiment could see the LEDs in certain branches of the LED filament to be arranged in parallel whilst the other LEDs in the LED filament may be comprised in a different fashion. The present embodiment is advantageous as lighting arrangements with different properties within a LED filament may be achieved in a cost efficient and easy-to-produce manner. Further, the parallel connection of LEDs may prove a more sustainable embodiment due to an increased durability.

According to an embodiment of the present invention, the LEDs of at least a first set of LEDs of the plurality of LEDs and the LEDs of at least a second set of LEDs of the plurality of LEDs are configured to emit light with at least one of the same color temperature and the same luminous intensity. This meaning, the color temperature, or the luminous intensity or both color the temperature and luminous intensity may be of the same intensity for multiple LEDs in the LED filament arrangement. The present embodiment is advantageous in that the LED filament arrangement provides an efficient solution for an even distribution of light.

By "set" of LEDs it is here meant a plurality of LEDs which are adjacent each other and interconnected with a wiring. For example, the LEDs of one branch of the LED filament may comprise a set of LEDs, whilst the LEDs in a second branch may comprise a different set of LEDs.

According to an embodiment of the present invention, the LEDs of at least a first set of LEDs of the plurality of LEDs and the LEDs of at least a second set of LEDs of the plurality of LEDs are configured to emit light with at least one of a different color temperature and different luminous intensity. It will be appreciated that LED filaments of different color temperatures or luminous intensity may be an aesthetically pleasing effect, which is often desirable. This embodiment is further beneficial as one LED filament may comprise branches with different color temperatures, meaning that there would be no need for multiple filaments to achieve the desired decorative effect. This is beneficial as the embodiment of the LED filament arrangement may thus be smaller, more energy efficient and cheaper to produce.

According to an embodiment of the present invention, the LED filament comprises an encapsulant, at least partially enclosing the plurality of LEDs. The encapsulant may comprise a luminescent material and may be configured to at least partly convert the light emitted by the plurality of LEDs. Hence, the encapsulant may be configured to at least partly convert the light emitted by the plurality of LEDs into converted light. By the term "encapsulant", it is here meant a material, element, arrangement, or the like, which is configured or arranged to surround, encapsulate and/or enclose the plurality of LEDs of the LED filament(s). The luminescent material of the encapsulant is configured to emit light under external energy excitation. For example, the luminescent material may comprise a fluorescent material. The luminescent material may comprise an inorganic phosphor, an organic phosphor and/or quantum dots/rods. The encapsulant is configured to at least partly convert the light emitted by the plurality of LEDs into converted light. For example, a UV/blue LED light may be partially or fully absorbed by the luminescent material and converted to light of another color e.g. green, yellow, orange and/or red. Preferably, the encapsulant of the LED filament is used with blue and/or UV LEDs. Furthermore, e.g. in the case of the LED filament comprising RGB LEDs, the encapsulant may comprise a light scattering material to scatter the light of the (RGB) LEDs. The light scattering material may comprise light scattering particles such as e.g. $BaSO_4$, $Al_2O_4$ and/or $TiO_2$ particles.

The encapsulant, e.g. comprising a luminescent material and/or light scattering material, may be arranged in a continuous profile on the LED filament and branch(es) thereof, thereby obtaining an improved decorative lighting effect and/or a better mimicking of a filament of a conventional lamp/bulb.

According to an embodiment of the present invention, the angle, α, between the at least one branch and the axis, A, of the LED filament is within the range of 10-80 degrees (preferred), such as 20-60 degrees (more preferred), and such as 30-50 degrees (most preferred). The present embodiment is advantageous in that the exemplified angle(s) between the branch(es) and the LED filament axis, A, are preferred at least from an aesthetical perspective.

According to an embodiment of the present invention, each branch of the least one branch is arranged at an angle, α, to the axis, A, which is at least 90 degrees.

According to an embodiment of the present invention, there is provided a LED filament unit comprising a plurality of LED filament arrangements. According to one of the previously described embodiments, the plurality of LED filament arrangements is coupled such that at least a first LED filament of the plurality of LED filament arrangements is in physical contact with at least a second LED filament of the plurality of LED filament arrangements. In other words, one or more first LED filament(s) is(are) connected, e.g. via one or more electrical contacts, to one or more second LED filament(s). This is advantageous as the LED filament unit may increase intended areas of use, as specific light scattering effects may be achieved. Additionally, the physical contact between the LED filaments may also include electrical contact between the LED filaments. Thus the LED filament arrangements in the LED filament unit may be coupled as to form structures where each individual LED filament arrangement does not need to be attached to electrodes other than those of another LED filament. This is advantageous as it may offer easier and less resource demanding LED filament units.

According to an embodiment of the present invention, the LED filament device comprises at least a first branch which is of a different length than at least a second branch of the LED filament device. According to an alternative embodiment of the present invention, the LED filament device comprises at least a first branch which is of the same length as at least a second branch of the LED filament device.

The variations of the LED filament devices mentioned may be useful as to create further aesthetically pleasing structures, where the length relation of the branches is selected to best accommodate a specific lighting purpose, with different structures and lighting effects obtainable. This is advantageous as the LED filament device easily can be produced for a plurality of varying needs, with relatively few alterations, thus reducing production costs. Additionally, the LED filament device may have the advantage of being more durable than other complex structures used to replace incandescent lamps.

BRIEF DESCRIPTION OF THE DRAWINGS

The above, as well as additional objects, features and advantages of the present invention, will be better understood through the following illustrative and non-limiting detailed description of embodiments of the present invention. Reference will be made to the appended drawings, on which.

All the figures are schematic, generally not to scale, and generally only show parts which are necessary in order to elucidate the invention, whereas other parts may be omitted or merely suggested.

DETAILED DESCRIPTION

Figure 1:
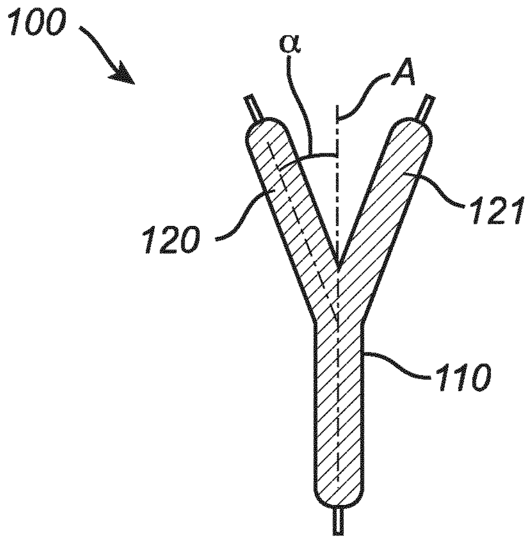
FIG. 1 schematically shows a LED filament arrangement according to an exemplifying embodiment of the present invention, FIGS. 2*a*-*b* schematically show a LED filament arrangement according to an exemplifying embodiment of the present invention, FIGS. 3*a*-*b* schematically show a cross-sectional view of a LED filament arrangement according to an exemplifying embodiment of the present invention, FIG. 4 schematically shows a LED filament arrangement according to exemplifying embodiments of the present invention, FIG. 5 schematically shows a LED filament unit according to exemplifying embodiments of the present invention, FIGS. 6*a*-*c* schematically shows a LED filament device according to an exemplifying embodiment of the present invention.

FIG. 1 shows a schematic view of a LED filament arrangement 100 according to an exemplifying embodiment of the present invention. The LED filament arrangement 100 comprises a LED filament 110 elongated along an axis A. Further, the LED filament 110 also comprises branches two 120, 121 extending at the bifurcation from the elongated LED filament 110. It should be noted that the number of branches of the LED filament 110 is arbitrary, and that the two branches 120, 121 are shown as an example.

The branch 120 of the LED filament 110 is extending from the axis A at an angle α. The angle α may preferably be within the range of 10-80 degrees, preferably 20-60 degrees, and most preferably 30-50 degrees. The LED filament 110 in the present embodiment comprises two branches 120, 121, extending in similar angles from the axis a. However, branches 120, 121 of the LED filament 110 may comprise different angles α and an asymmetrical shape may thus be achieved.

The LED filament arrangement 100 comprises a plurality of LEDs (not shown), which may be attached to a carrier. The carrier may be a substrate which may be flexible or rigid.

The LED filament 110 further comprises an encapsulant comprising a translucent material, wherein the encapsulant at least partially encloses the plurality of LEDs. For example, the encapsulant may fully enclose the plurality of LEDs, that is including the part of the bifurcation. The encapsulant is preferably a polymer material, for example made of silicon.

The LEDs may be direct emitting LEDs which provide a color. The LEDs may be RGB, UV or blue LEDs. Further combinations of LEDs, e.g. UV LEDs and blue light LEDs, may be used. The LEDs may also comprise laser diodes.

The color temperature of the white light is preferably in the range of 1800 to 6000 K, more preferably in the range from 2000 to 5000 K, most preferably in the range from 2200 to 4000 K such as for example 2300 K or 2700 K. The white light has preferably a CRI of at least 75, more preferably at least 80, most preferably at least 85 such as for example 90 or 92.

The encapsulant of the LED filament 110 may comprise a luminescent material, which is configured to emit light under external energy excitation. The UV/blue LED light may be partially or fully absorbed by the luminescent material and converted to light of another color e.g. green, yellow, orange and/or red. The luminescent material may for example comprise; inorganic phosphor, organic phosphor and/or quantum dots/rods.

Figure 2A:
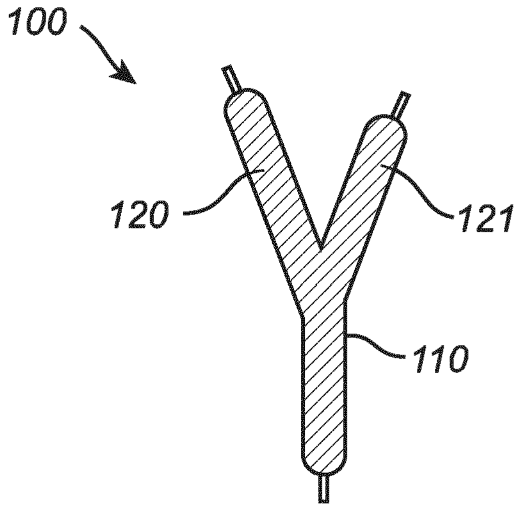
Figure 2B:
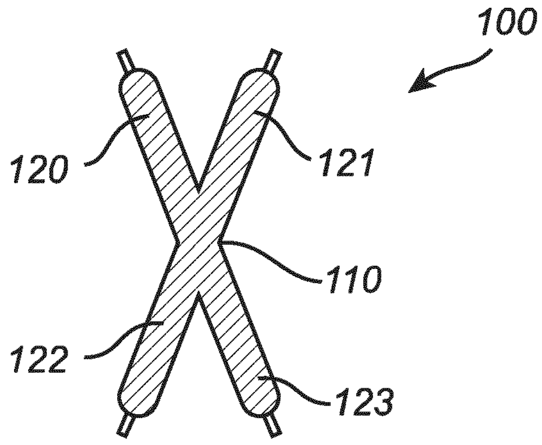

FIGS. 2*a* and 2*b* shows further embodiments of LED filament arrangements 100. It should be noted that the LED filament arrangement 100 of FIGS. 2*a* and 2*b* may be similarly configured as the LED filament arrangement 100 described in connection with FIG. 1, and it is referred to FIG. 1 for an increased understanding. FIG. 2*a* displays a Y-shaped LED filament arrangement 100 and FIG. 2*b* displays an X-shaped LED filament arrangement 100 (although not shown, the LED filament arrangement 100 may alternatively have a K-shape). The LED filaments 110 illustrated in FIGS. 2*a* and 2*b* represents embodiments in which a plurality of branches are provided. As seen, the LED filaments 110 may comprise a different number of branches 120, 121. The branches 120, 121 of a LED filament 110 may, for example, be directed in different angles and directions, and may be of different lengths.

As exemplified in FIG. 2*a*, the Y-shaped LED filament 110 may comprise branches 120, 121 of equal or unequal length, while still maintaining a Y-shape.

As illustrated in FIG. 2*b*, a symmetrical LED filament 110 of an X-shape is provided such that a plurality of end portions in both the top and bottom of the LED filament 110 is achieved. The X-shaped LED filament 110 comprises four branches 120, 121, 122, 123, having the bifurcation in the center of the X-shaped LED filament. The X-shaped LED filament 110 could also be asymmetric in the same manner as the Y-shaped LED filament 110 discussed in regard to FIG. 2*a*.

Figure 3A:
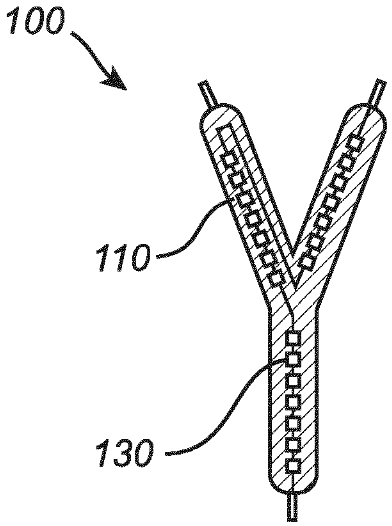
Figure 3B:
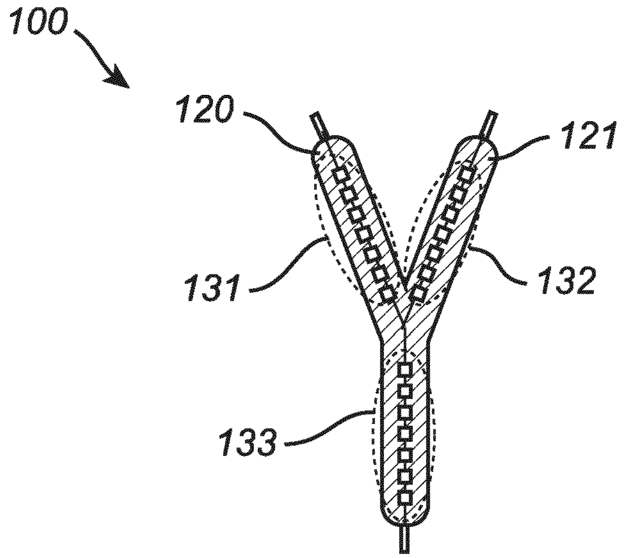

FIGS. 3*a* and 3*b* schematically show cross sections of a LED filament 110 of the LED filament arrangement 100, comprising an array or "chain" of LEDs 130. The LEDs are arranged in the LED filament arrangement 100 such that the line of emission of the array of a plurality of LEDs continues through the branches.

The array of LEDs 130 may comprise a plurality of adjacently arranged LEDs 130 wherein a respective wiring is provided between each pair of LEDs 130.

FIG. 3*a* displays an embodiment in which all LEDs 130 are connected in series.

FIG. 3*b* displays an embodiment of a LED filament arrangement 100 comprising two branches 120, 121. A plurality of the LEDs, among the array of LEDs 130, may be further defined as a set of LEDs 131, 132, 133. Here, the LED filament 110 comprises individual sets of LEDs 131, 132, where the sets of LEDs 131, 132 are connected in parallel. The set of LEDs 133 of the unbranched portion of the LED filament 110 is connected in series with the sets of LEDs 131, 132 of the branches.

Other embodiments may see further combinations of sets or individual LEDs connected in parallel, series or any combination thereof. The structure of the LED filament may for example cause different sections of the LED filament arrangement 100 to be of different luminous intensity.

Figure 4:
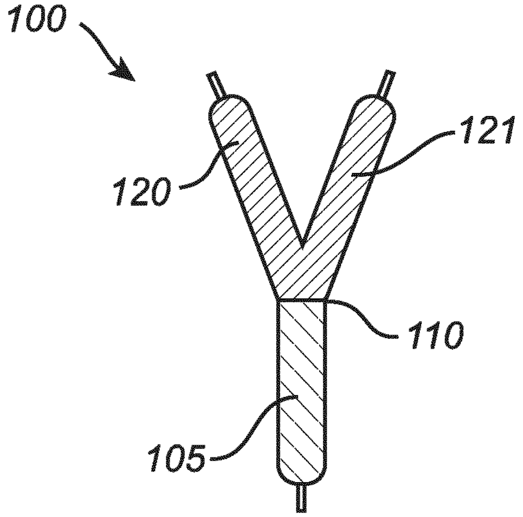

FIG. 4 shows an embodiment of a LED filament arrangement 100 in which one portion 105 of the LED filament 110 is of a different color temperature, or a different luminous intensity, than the branches 120, 121 of the LED filament 110. It is understood that other sections or combinations of sections of the LED filament 110 may be arranged for having different color temperature, or luminous intensity. For example, different colors (temperatures) may be obtained by using LEDs emitting different colors and/or using different luminescent materials (e.g. phosphors such as a red phosphor or the combination of a yellow and red phosphor) in different parts of the LED filament arrangement 100, e.g. in an encapsulant of the LED filament 110.

Figure 5:
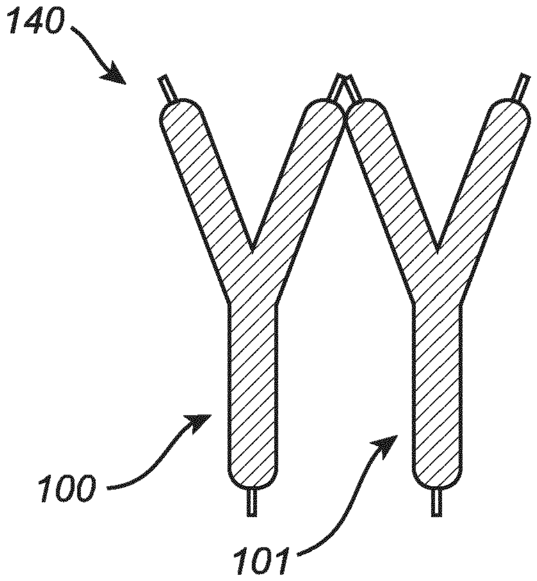

FIG. 5 displays a schematic representation of an embodiment of a LED filament unit 140. As illustrated, the LED filament unit 140 may comprise two LED filament arrangements 100, 101, which are in physical, and electrical, connection. In this exemplified illustration, two end portions of the LED filaments 100, 101 are in contact, but other configurations are also possible. Further, the LED filament unit 140 may comprise any plurality of LED filament arrangements 100, 101. Further, the LED filaments 100, 101 may be arranged in any desirable manner in which at least one LED filament arrangement 100 is in physical contact with at least one other LED filament arrangement 101.

Figure 6C:
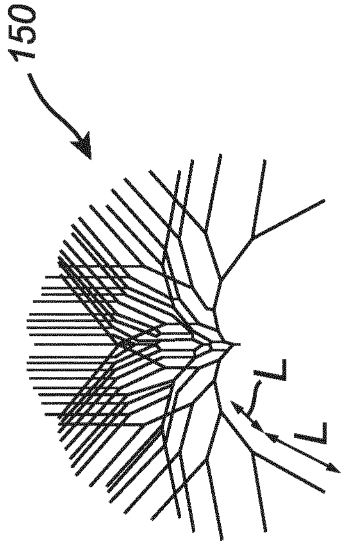
Figure 6B:
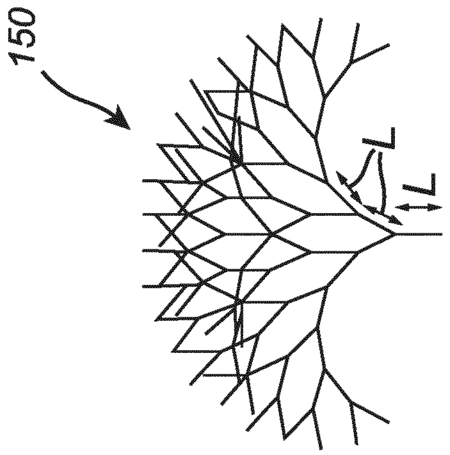
Figure 6A:
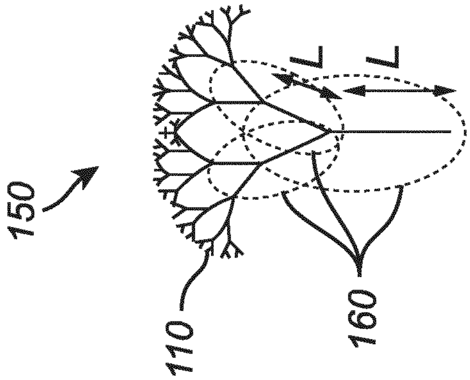

FIGS. 6*a*, 6*b* and 6*c* schematically show a LED filament device 150 which comprises n sets of LED filaments 160. As illustrated, each set of LED filaments 160 comprises at least one branched LED filament 110. The branched LED filament 110 of the $(k+1)^{th}$ set of LED filaments 160 constitutes a branch of the branched LED filament 110 of the $k^{th}$ set of LED filaments 160, wherein k represents a set of LED filaments and where k=1, 2, . . . , n−1. Consequently, the set of LED filaments 160 can be understood to represent a layer in a tree like structure. As depicted in FIGS. 6*a*, 6*b* and 6*c*, this iterative structure forms a tree-like shape where each branch of a branched LED filament 110 is further branched into new LED filaments 110, and so on. As illustrated, the length L of the LED filament 110, which extends along an axis A may be of varying length. In the embodiment displayed in FIG. 6*a*, the length L is decreased for each set of LED filaments 160 in the tree-like shape of the LED filament device 150. The length L is preferably in the range from 2 cm to 10 cm.

FIG. 6*b* schematically shows a similar LED filament device wherein the length L is the same for each set of LED filaments 160 of the tree-like structure.

FIG. 6*c* schematically shows a similar LED filament device wherein the length L is increasing for each set of LED filaments 160 of the tree-like structure.

The length L may thus be utilized to create numerous shapes and structures, exemplified in FIGS. 6*a*, 6*b* and 6*c*.

The invention claimed is:

1. A light emitting diode, LED, filament arrangement, comprising n sets of LED filaments, each filament comprising an array of a plurality of light emitting diodes, LEDs, wherein the LEDs are attached to a single carrier, wherein the at least one LED filament is of an elongated shape, and at least partially extends along an axis, A, and wherein each LED filament comprises a bifurcation from which the LED filament forks into at least two branches of which at least one of the branches is arranged at an angle with respect to the axis A, the angle represented by the symbol a, wherein each LED filament comprises an encapsulant integrally enclosing the LED filament including the at least two branches and the bifurcation, and wherein at least one LED filament of a $(k+1)^{th}$ set of LED filaments constitutes at least one branch of the at least one LED filament of a $k^{th}$ set of LED filaments, in an iterative manner from k=1, 2, . . . , n−1, such that the n sets of LED filaments constitute a tree structure of LED filaments with at least one bottom end LED filament branch and two or more opposite top end LED filament branches of the tree structure.

2. The LED filament arrangement according to claim 1, wherein the LEDs in the array are arranged to provide a continuous light distribution over an entirety of each LED filament including the at least two branches.

3. The LED filament arrangement according to claim 1, wherein a line of emission of the array of a plurality of LEDs continues through the branches.

4. The LED filament arrangement according to claim 1, wherein at least a first branch of the plurality of branches has a different length than a second branch of the plurality of branches.

5. The LED filament arrangement according to claim 1, wherein the at least one LED filament is Y-shaped.

6. The LED filament arrangement according to claim 1, wherein the at least one LED filament is X-shaped.

7. The LED filament arrangement according to claim 1, wherein the LEDs in the at least two branches of the plurality of LEDs in the at least one LED filament are connected in series.

8. The LED filament arrangement according to claim 1, wherein the LEDs of at least a first set of LEDs of the plurality of LEDs and the LEDs of at least a second set of LEDs of the plurality of LEDs in the at least one LED filament are connected in parallel.

9. The LED filament arrangement according to claim 1, wherein the LEDs of at least a first set of LEDs of the plurality of LEDs and the LEDs of at least a second set of LEDs of the plurality of LEDs are configured to emit light with at least one of the same color temperature and the same luminous intensity.

10. The LED filament arrangement according to claim 1, wherein the LEDs of at least a first set of LEDs of the plurality of LEDs and the LEDs of at least a second set of LEDs of the plurality of LEDs are configured to emit light with at least one of different color temperature and different luminous intensity.

11. The LED filament arrangement according to claim 10, wherein the encapsulant comprises a luminescent material and is configured to at least partly convert the light emitted by the plurality of LEDs, or the encapsulant comprises a scattering material for scattering the light emitted by the plurality of LEDs.

12. The LED filament arrangement according to claim 1, wherein the angle, α, between the at least one branch and the axis A is within a range of 10-80 degrees.

13. A light emitting diode, LED, filament unit, comprising a plurality of LED filament arrangements according to claim 1, wherein the plurality of LED filament arrangements is coupled such that at least a first LED filament of the plurality of LED filament arrangements is in physical contact with at least a second LED filament of the plurality of LED filament arrangements.

14. The LED filament arrangement according to claim 1, wherein the angle, α, between the at least one branch and the axis A is within a range of 20-60 degrees.

15. The LED filament arrangement according to claim 1, wherein the angle, α, between the at least one branch and the axis A is within a range of 30-50 degrees.

* * * * *